Sept. 22, 1964 J. F. SINTES ETAL 3,149,800
FLYING MACHINE AND APPARATUS THEREOF
Filed Oct. 26, 1962 4 Sheets-Sheet 2
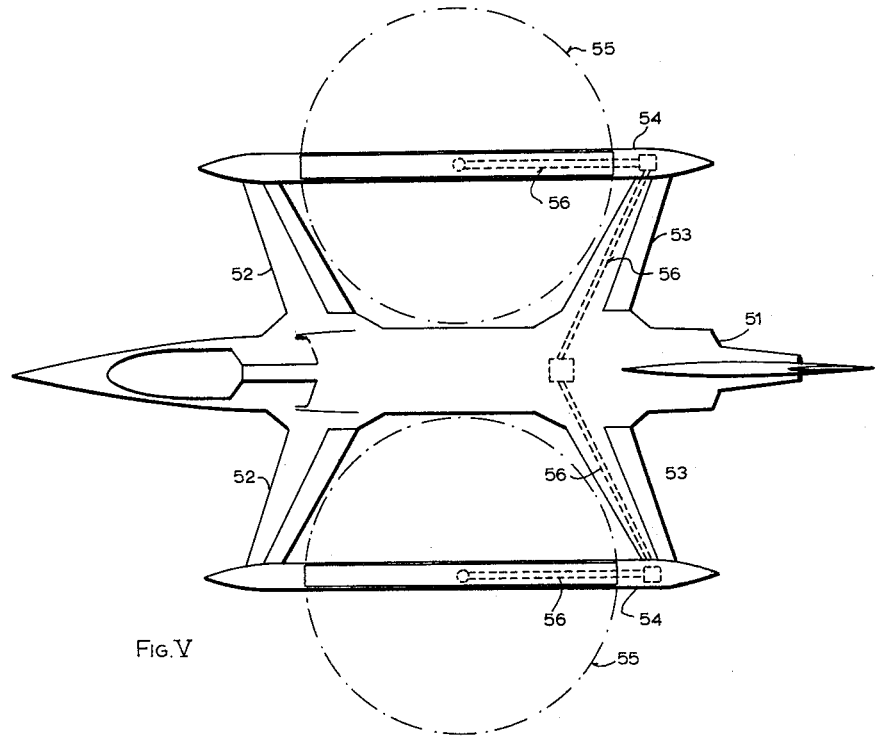
Fig. V
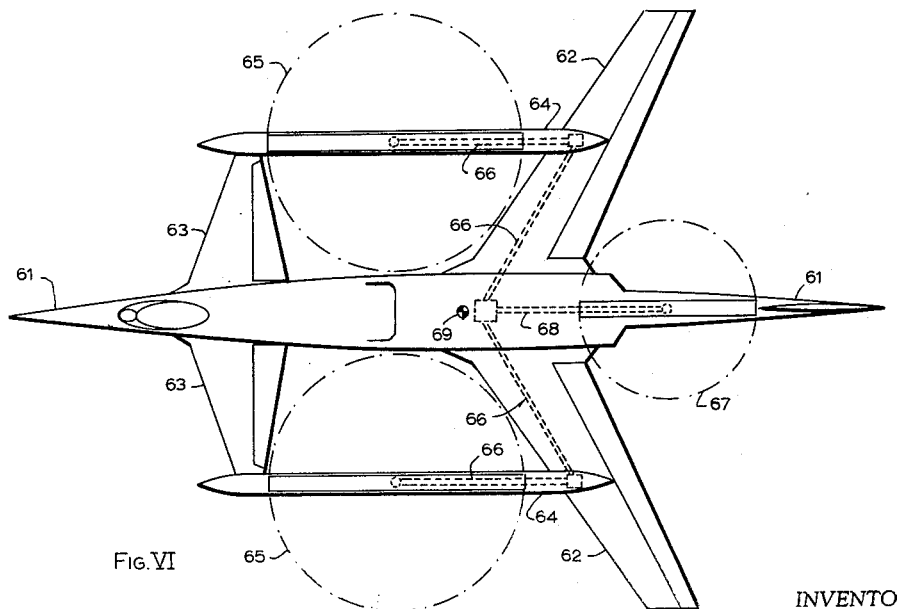
Fig. VI
INVENTORS
JULIO FERNANDEZ SINTES
ALBERTO ALVAREZ-CALDERON
BY Sept. 22, 1964     J. F. SINTES ETAL     3,149,800
FLYING MACHINE AND APPARATUS THEREOF
Filed Oct. 26, 1962                         4 Sheets-Sheet 3
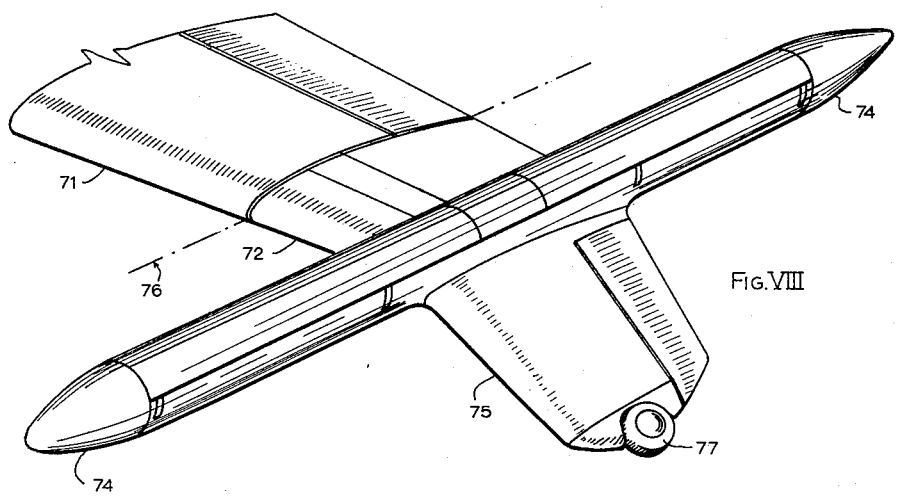
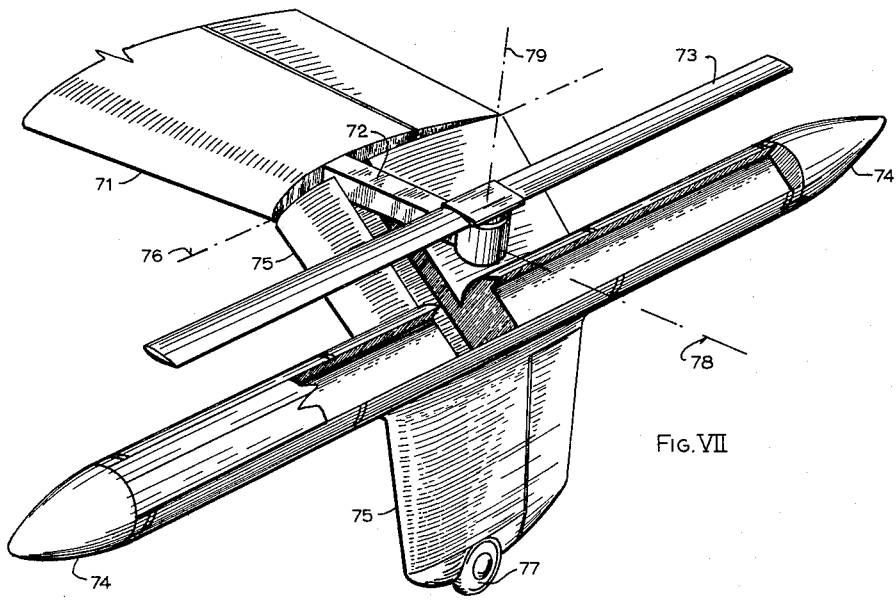
INVENTORS
JULIO FERNANDEZ SINTES
ALBERTO ALVAREZ-CALDERON
BY

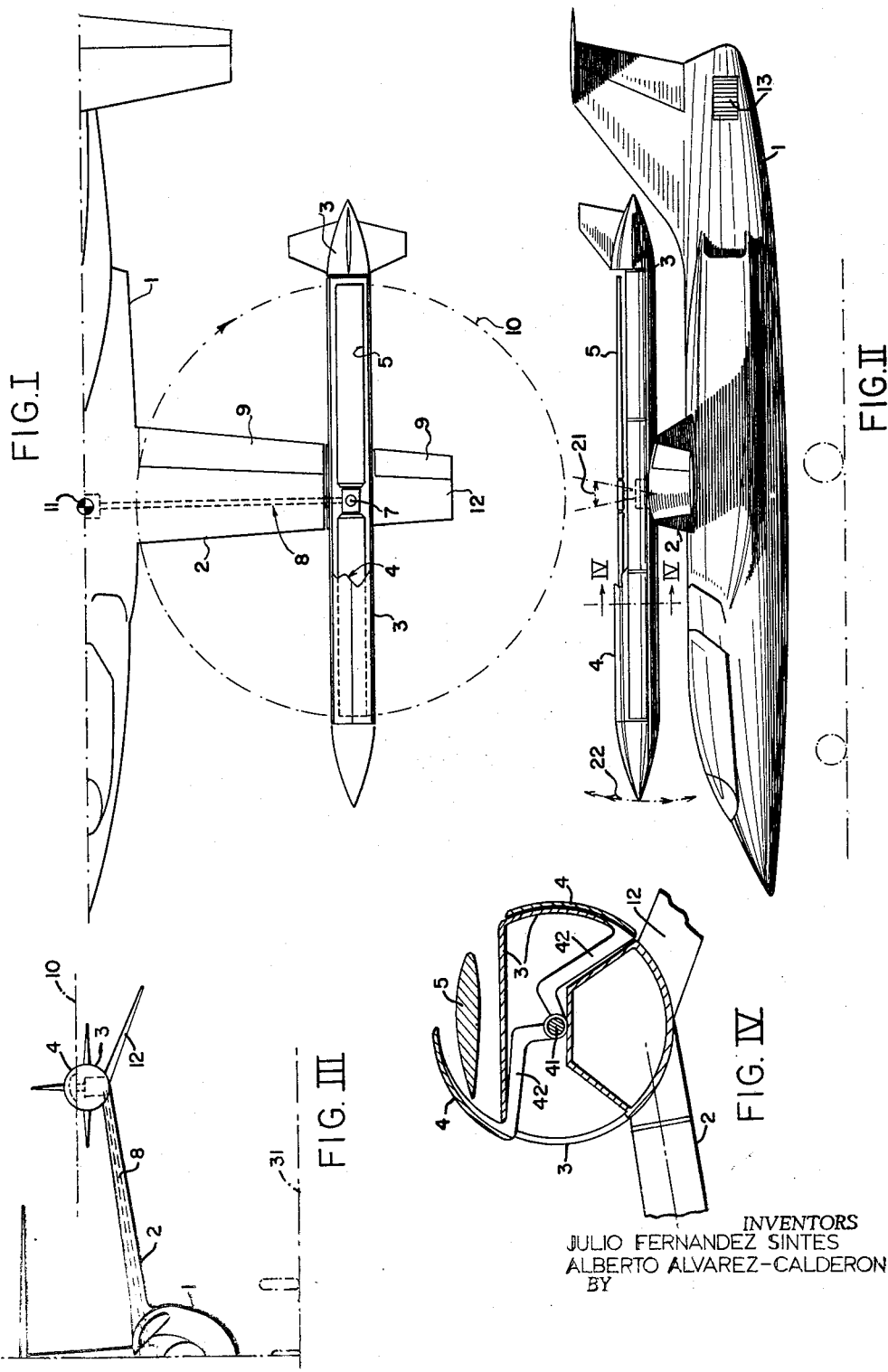

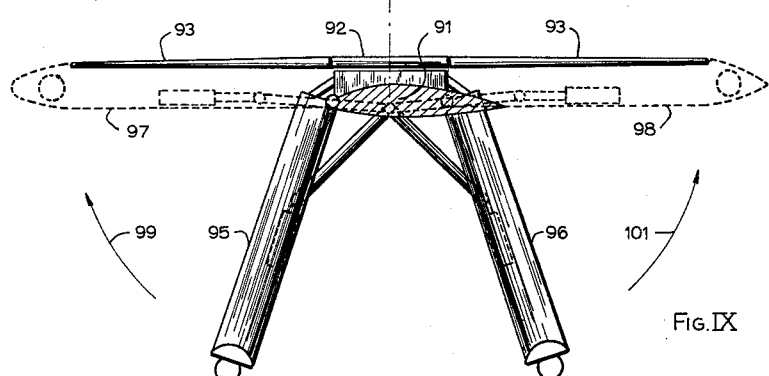
Fig. IX
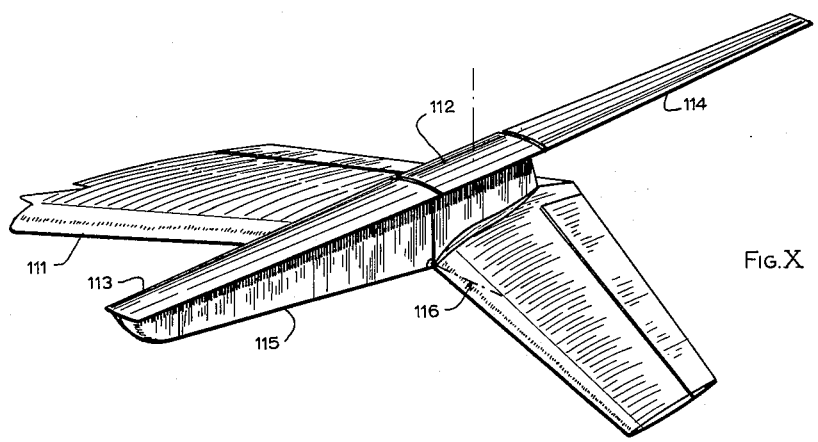
Fig. X
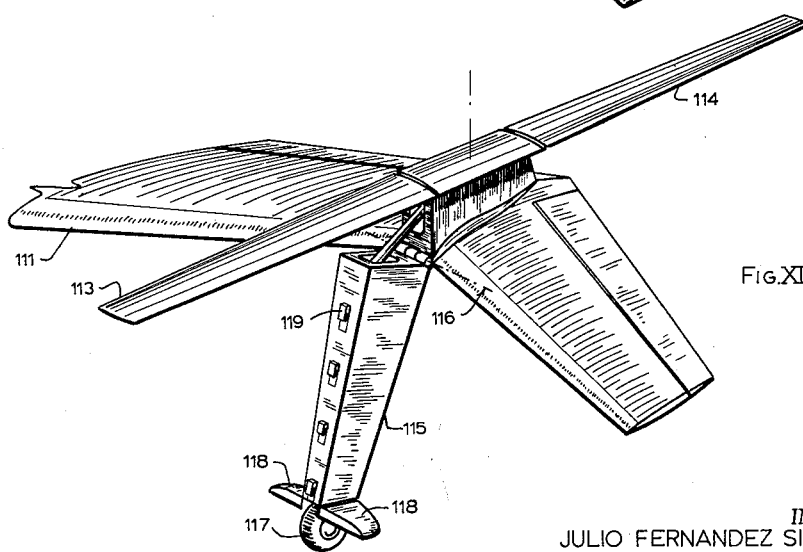
Fig. XI
INVENTORS.
JULIO FERNANDEZ SINTES
ALBERTO ALVAREZ-CALDERON
BY

United States Patent Office

3,149,800
Patented Sept. 22, 1964

3,149,800
FLYING MACHINE AND APPARATUS THEREOF
Julio Fernandez Sintes, 914 Moreno St., and Alberto Alvarez Calderon, 1560 Castilleja St., both of Palo Alto, Calif.
Filed Oct. 26, 1962, Ser. No. 233,404
18 Claims. (Cl. 244—7)

The present invention is related to heavier-than-air vertical take-off aircraft. More specifically, this invention relates to vertical take-off convertiplanes utilizing rotors for vertical flight, and other propulsive devices for horizontal flight.

It is known that the helicopter which utilizes a large rotor for vertical flight is the most efficient hovering machine available, but it is limited in its forward speed capability because of blade compressibility and blade stall in the rotor. It is also known that aircraft flying at very high speeds should either utilize small propellers, or preferably jet propulsion in order to have efficient horizontal translation. Airplane designers in the past have attempted to create vehicles which combine the hovering capability of a helicopter with the high speed characteristics of conventional aircraft by designing so-called convertiplanes, which are vehicles having features of vertical flight and high speed horizontal flight. The type of vehicles that have originated are too numerous to summarize here; they are well known in the art. However, the ones that are pertinent to mention in this specification are those utilizing a relatively large rotor for vertical flight, and other devices for lift production in horizontal flight. In this group, there has been an attempt to retract or otherwise dispose of the rotor's drag and lift forces for the high speed flight regime in order to decrease the aircraft drag. Some of the existing solutions are telescoping rotor blades like those shown in U.S. Patent 2,989,268; others have a retractable rotor into an otherwise conventional aircraft wing, one disadvantage of the latter type of solution is that the wing becomes structurally complicated in that it has to house a rotor; additionally there are problems of transition because the rotor has to stop, and the wing surface deformed in a manner unfavorable for lift production. Furthermore, in hover, a large portion of the rotor downwash falls on top of the wing thereby reducing hovering flight efficiency.

Yet another type of convertiplane is that in which the rotor is submerged inside a central fuselage. One serious problem of course is providing retractable rotor fairings for the full length of a single two-bladed rotor. A more serious problem is that produced in transition when the large rotor blade approaches zero rotation of speed: these problems are twofold, one is due to the necessarily unsymmetric air loads developed by the slowly moving rotor blades as they affect aircraft stability in transition, another is the difficulty of providing a sufficiently strong blade to resist the air loads on the blade developed at high speeds in transition, in the absence of blade centrifugal effects.

The type of problems encountered are so serious that in fact no production airplane with submersible or telescoping rotors has been produced in practice, even though numerous paper attempts have been considered. These problems have been aggravated by the fact that past convertiplanes using helicopter type of rotor have proposed rotor diameters which are too large and impractical; the adequate disc loadings and rotor diameters for the convertiplane are of importance to render the structure practical.

It is the purpose of this invention to provide a practical high speed convertiplane aircraft which is nevertheless capable of efficient hovering.

One more object of this invention is to provide a convertiplane of the type described which has good transition characteristics between the hovering and high-speed flight regimes.

Yet one more object of this invention is to provide rotor structure for the convertiplane of the type described utilizing two lateral rotors instead of a central rotor, thereby decreasing the length of each blade for a given total disc area.

Yet one more object of this invention is to provide a convertiplane which in the transitional regime has blade loads which are symmetric which respect to the central fuselage.

Another objective of this invention is to provide a convertiplane in which the rotor blades are relatively small in radius thereby producing smaller blade loads when the blades approach zero type rotational speed at high speeds in transition.

Yet another object of the invention is to provide a convertiplane of the class described having a simplified structural mechanism to fair the rotor blades into cylindrical containers aligned with the directional flight of the aircraft and disposed laterally from it mounted adjacent to the wing tips.

One more objective of the invention is to provide structure for a combination wing-tip fuel tank and a wing-tip mounted rotor which can be faired into the tip tank.

Another object of the invention is to provide convertiplanes of the class described operating at disc loadings substantially higher than those of helicopters in order to provide a structure of practical size.

Yet another objective of the invention is to provide a convertiplane arrangement in which aircraft control in hover and transition is provided by variations of collective pitch of laterally mounted rotors.

Another objective of the invention is to provide a convertiplane having a pair of symmetrical and laterally disposed rotors which are capable of tilting their axis in vertical fore and aft planes.

Yet another objective of the invention is to provide control for the convertiplane of the type described in the previous paragraph by differential tilting of the rotor axis.

These and other objectives of this invention will become more readily apparent from a perusal of the drawings pertinent to this specification in which:

FIGURE I shows in top view the left side of a convertiplane according to the invention, showing the left rotor of the craft mounted adjacent to the left wing tip and faired within a wing-tip fuel tank.

FIGURE II shows in side elevation the convertiplane of FIGURE I illustrating the wing-tip tank-rotor blade combination.

FIGURE III shows in front elevation the convertiplane of FIGURE I and illustrates some details of relative rotor position and wing dihedral.

FIGURE IV is a cross-sectional view of the wing-tip tank-rotor housing shown in FIGURE II.

FIGURE V shows in plane view an alternate form of support of the lateral rotors of the convertiplane, illustrated in a superior tandem wing configuration having generally two planes of symmetry.

FIGURE VI illustrates another alternate form of the invention embodied in a Canard-type aircraft and incorporating a third tail rotor.

FIGURE VII shows in perspective an embodiment of the invention in which the tip tank moves downwardly.

FIGURE VIII is a different view of FIGURE VII.

FIGURE IX shows in side elevation an arrangement in which the tip tank is pivoted downwards.

FIGURE X shows in perspective a modified rotor blade nacelle fairing only one blade of the rotor.

FIGURE XI is a different view of FIGURE X.

With initial reference to FIGURE I, we show in partial top view the left hand side of our convertiplane illustrating a preferred embodiment of our invention. Specifically, we show therein the left side of fuselage 1 having a fixed left wing panel 2 extending laterally thereof. The wing panel in turn supports a wing tip fuel tank 3 aligned with the direction of high speed flight of the aircraft, and a helicopter-type rotor 5 which in the drawing is shown faired and parallel to the tip tank. The tip tank 3 is shown having a door 4 shown partially, which door serves to enclose the blade 5 within a cylindrical wing-tip tank to provide a smooth low drag faired body for high speed flight. The mechanism for housing the blade 5 in tip tank 3 will be shown in greater detail in subsequent figures.

The mode of operation of rotor 5 is as follows: for hovering flight door 4 is displaced downwardly out of the path of blade 5 (as will be shown later), and blade 5 is made to rotate about shaft 7 to determine a circular lifting disc 10 shown in dash-dot lines. Shaft 7 in turn is driven by spanwise shaft 8 which is connected to the aircraft power plant and to the rotor blade of the right-hand side of the airplane (neither the power plant nor the right-hand side of the airplane are shown in the figure). The power plant may be a conventional engine driving a shaft 8 by the method suggested in U.S. Patent 2,749,059. The details of rotor control may be constructed according to the aforementioned patent; preferably however, the rotor should be with rigid blades having only freedom of blade pitch but no other hinges. Evidently by sufficient thrust production of blade 5 due to its rotary motion along path 10, and the corresponding thrust of the blade on the opposite side of the aircraft, vertical flight is produced. Aircraft roll control is provided by setting the collective pitch control of the left-hand rotor differently from that of the right-hand rotor. Pitching stability in hovering is provided by having the sum of rotor lift vector passing approximately through the aircraft center of gravity. Pitch control is provided by cyclic pitch control on the rotors, or by conventional deflection of the exhaust of a fuselage mounted gas turbine. Yaw control may be applied by differential cyclic pitch control applied to the laterally mounted rotors of the craft, or by deflecting jet exhaust by optional deflectors 13. For transition equal application of cyclic pitch to both rotors is used to tilt the aircraft forward and initiate forward motion, then gradual application of jet propulsion is made until high speed flight is achieved.

In FIGURE I, however, there is shown one additional feature which may be utilized for control and for transition: in FIGURE I, tip tank 3 with its corresponding blade 5 and wing tip portion 12 may be mounted on wing 2 by means of a pivotal axis such that the tip tank and rotor can be tilted, as an assembly, on a generally vertical plane, about shaft axis 8, resulting actually in a simple tilt rotor arrangement. Thus, for example, in order to have transition from vertical flight to horizontal flight, the rotors and their tip fuel tanks may be tilted forward about axis 8 to introduce a forward component to move the aircraft in that direction. This tilting will be illustrated later with the aid of FIGURE II in a later portion of the specification. For yaw control, opposite tilting of the rotors is used.

Other features of interest of FIGURE I are as follows: the use of two rotor blades provides a large disc area with a relatively small blade radius. This is advantageous to decrease blade loads at the end of the transition flight regime, when the blades may have little centrifugal effect due to low blade speeds but yet may have to support large air loads due to the high translational speed of the aircraft. Additionally, however, these large loads on the slowly moving blades are laterally symmetrical to the aircraft thereby resulting in little complication in yaw and roll in transition: this obviously would not be the case if instead of having two symmetrical rotors, a single large, centrally located rotor would be utilized. Furthermore, the ingenious combination of wing-tip fuel tank with the lifting rotors permits the design of a conventional fuselage and high speed wings in which the fuselage does not interfere with the propellers' downwash; neither does the rotor make any geometric or structural impositions on the fuselage or wings. The wing should be preferably designed with large flaps 9 which in hover should be deflected approximately 90 degrees to minimize rotor downwash-wing interference; in transit, they can be retracted gradually to provide high lifts during the shift from rotor lift to wing lift. At the end of transition, rotor 5 is brought to a complete stop on top of fuel tank 3, and the door 4 is closed housing the rotor for high speed flight, as will be described in greater detail later. Rotor 5 can be stopped by a conventional drum break action on shaft 8.

With reference to FIGURE II, we show therein a side view of the convertiplane of FIGURE I. Some details which are shown with greater clarity on FIGURE II are the relative position of rotor blade 5 with respect to wing tip tank 3, and the position of fairing door 4 which is shown partially. This relative position of the rotor, the tip fuel tank, and the fairing door will be shown in greater clarity by means of section IV, and will therefore be omitted here. It is of interest to note, however, in FIGURE II, the optional tilting of the tip tank rotor assembly discussed in connection to the transitional maneuver in FIGURE I. Specifically, the tilting of the rotor shaft axis should be of the order included in arrow 21; this would produce angular displacement of the tip tank nose of the order shown by arrow 22. This latter angular displacement is useful to determine the angle of attack of the rotor disc with respect to relative airspeed in the high speed end of the transitional maneuver. This angle of attack can be kept very small by this tilting freedom, therefore the air loads of the slowly moving rotor as it approaches zero r.p.m. which are due to disc angle of attack can be minimized. Another point of interest of FIGURE II, is the design of the tip fuel tank. Several interruptions along its length are shown which permit not only the emergence of brackets to support fairing door 4, but also serve as fuel baffles. This interruption by baffles, however, need not be the full depth of the tank. Indeed, a continuous channel is present at the lower portion of the tank connecting the fuel volumes between the baffles.

In FIGURE III, we show a front elevation of FIGURE I. Of specific interest, there is shown the ingenious method to obtain a high position and large clearance for the rotor blades above ground 31. Specifically, there is shown that wing 2 has large positive dihedral in order to raise the plane of the rotor; however, in order to prevent undesirable dutch-roll in stability due to dihedral the outer wing portion 12 outboard of the tip tank is shown having cathedral or negative dihedral. It should also be observed in connection to FIGURES I and III that due to the symmetry of downwash about the vertical central plane of the aircraft, the interaction between ground plane and rotor flow is not unfavorable; in fact, it is favorable in that a high pressure area is created below the fuselage.

FIGURE IV shows a cross-sectional view of the wing-tip fuel tank 3, rotor 5 and door fairing 4. Specifically, tip fuel tank 3 is shown substantially of circular cross-section having an axis of symmetry 41 about which are mounted by means of ingenious brackets 42 doors 4 which have pivotal motion only, and which are capable of fairing rotor 5 inside the tip cylinder by simple angular displacements. It should be observed that the mechanism shown is an extremely simple one and therefore a practical one. It is an elegant solution which makes it unnecessary to have vertical displacement of the rotor in order to provide rotor clearance.

It is of interest to summarize the features of the aircraft described in FIGURES I, II, III and IV. The convertiplane shown has an overall high speed configuration similar to those of conventional supersonic aircraft. The fuselage is not compromised at all by the means needed for vertical takeoff flight, and though the wing-tip tanks which house the rotors are somewhat larger than the usual ones, the increment of skin area of the wing tip tanks due to the rotor's presence is balanced by the decrease of the wing area. This decrease of wing area is possible because a large wing area is no longer required for landing and takeoff. The hovering characteristics of the convertiplane approach closely those of the helicopter of a relative large disc loading. It is evident that with the flaps deflected, the interference between the rotor slipstream and the aircraft is a minimum. Furthermore, favorable ground effect is present. One more feature of great practical significance is that the rotors can be faired smoothly into the wing tip tanks without touching the wings or the fuselage of the vehicle. In that sense, the convertiplane system can be adapted to existing aircraft by the utilization of standard collective and cyclic pitch control on the rotors, the convertiplane control system is a perfectly satisfactory one, furthermore problems of control mechanisms hovering and transition can be solved within the means known in the state of the helicopter art. The problem of fuel storage which is critical for high speed jet aircraft, as well as the added problem of rotor storage for high speed flight, are solved by the most advantageous wing-tip tank-rotor housing combination shown. Satisfactory rotor ground clearance for operational reasons is obtained by the ingenious wing configuration used. Finally, it should be observed that the rotor fairing is accomplished not by the usual rotor displacement relative to a fuselage or wing nor by the cumbersome telescoping rotor blades proposed in the past, but with an elegant and practical structure wherein only pivoted doors of simple design and short length are utilized.

It is evident by inspection of this convertiplane that its disc loading is of a lower order than those possible by fan-wing VTOL aircraft, pure jet lift convertiplanes, or from ducted propeller convertiplanes. Therefore, the lifting efficiency of the system is superior. It is also evident from what has been said before, and by inspection of the figures, that the structures of this convertiplane are extremely simple compared to those of other systems, the overall high speed aircraft configuration is well known and efficient, and the transition and hovering control are accomplished by methods and mechanisms known and proved in the helicopter art. Therefore, this convertiplane has unique and superior features which make it most desirable for vertical takeoff as well as for very efficient high speed flight.

So far we have described the convertiplane invention in a preferred embodiment utilizing lateral rotors as shown in FIGURES I through IV. We shall now describe alternate forms of the invention illustrated in tandem wing configuration as shown in FIGURE V, and in Canard wing configuration as shown in FIGURE VI.

Specifically, in FIGURE V, we show a convertiplane having a central fuselage 51, a pair of forward wings 52 and a pair of rearward wings 53. Between the wing tips on each side of the fuselage, there extends a wing tip fuel tank 54 generally parallel to the central fuselage 51. Each of tip tanks 54 supports a helicopter rotor 55. Rotors 55 are inter-connected by shafting 56 and are driven by a central engine in a conventional fashion. It is evident by inspection that the rotor thrust resultant force acts at approximately the middle of the fuselage 51, which is also the approximate location of the aerodynamic center and center of gravity of the aircraft with the tandem wings as shown. The methods of aircraft control and rotor housing mechanisms should be similar to those exemplified in the aircraft of FIGURE I. It should be observed carefully that the interference effect by the aircraft shown in FIGURE V and its rotor slipstream is an absolute minimum and superior in that respect to any other known configuration; its ground effect characteristics are also very favorable.

FIGURE VI shows the incorporation of our convertiplane system to a Canard aircraft. Specifically, there is shown the fuselage 61 having forward Canard surfaces 63 and main lifting surfaces 62. On each side of the aircraft, extending between the Canard surface and the main surface, there is shown a cylindrical body 64 which supports a rotor 65. The rotors are inter-connected to each other by means of shafting 66. The aircraft also shows a rearward rotor 67 inter-connected to the shafting system of the main rotors by means of auxiliary shaft 68. The resultant lifting force of the three rotors acts vertically at 69 which is approximately the location of the aerodynamic center of the configuration and also the center of gravity of the configuration.

So far we have presented the embodiments of the invention in which the rotor is shown in combination with fuel tanks or nacelles which were fixed relative to the airframe. We will now present embodiments of the invention with the fuel tanks or nacelles having relative displacements with respect to the supporting airframe and the rotor.

Specifically in FIGURE VII, we show a wing portion 71 having a cantilevered bracket 72 which supports a lifting rotor 73 which is shown in an operative disposition capable of rotating about axis 79. In this embodiment of the invention, however, in order to provide clearance between rotor 73 and its rotor fairing nacelle 74, the nacelle 74 is mounted on a pivotally supported wing tip 75 which pivots at axis 76 supported by wing 71. The entrance and emergence of nacelle 74 into a rotor-fairing position is accomplished by counter clockwise motion of wing tip 75 with respect to wing 71, and with the aid of nacelle doors of the type described in connection to FIGURE IV to allow entrance and emergence of nacelle and rotor. It is also evident by inspection of FIGURE VII and the logical relation it has to FIGURE III, that the tip portion 75 of the wing is extremely useful to serve as a stabilizing auxiliary gear for lateral stability in the ground. This permits the utilization of a single central gear on the fuselage with the consequent economy of weight and volume. In FIGURE VII, a small wheel 77 has been shown. However, tip portion 75 could even serve as main gear struts if desired.

The structure of FIGURE VII is shown in the faired-rotor high-speed position in FIGURE VIII, showing the tip 75 raised upward and the nacelle doors closed around the rotor. It is evident by inspection that a smooth low-drag configuration results. One additional feature of interest is that the nacelle position as shown on FIGURE VII is that it permits tilting of the rotor about axis 78 in order to introduce forward and/or control forces in a simple manner and without danger of collision with the nacelle. Additionally the nacelle remains aligned with the flow for all positions of the wing tip, as is evident by inspection of FIGURES VII and VIII.

FIGURE IX illustrates a different arrangement of movable rotor nacelles or fuel tanks; it shows a side elevation very similar to that of FIGURE II. Specifically, there is shown in side elevation a wing tip 91 supporting a rotor having a central portion 92 and an articulated portion 93. The wing also supports rotor nacelle fairings 95 and 96 which are articulated adjacent to the wing's leading and trailing edge respectively. As shown, the rotor nacelle fairings also act as a landing gear which is extremely suitable for both ground stability and for fuselage and wing clearing of large cargo payload which can obviously be placed below the aircraft directly. Therefore this system is particularly well suited for fairing of crane-type convertiplanes according to the invention. For high speed flight, fairings 95 and 96 are moved along paths 99 and 101 respectively to final positions 97 and 98 in which they form an aerodynamic and structural complement to the stationary rotor blade. The relationship between the fairing and the blade is more clearly illustrated in FIGURES X and XI which show a similar nacelle fairing but installed only in the upstream blade of a stationary rotor. The reasons for this arrangement are as follows: when the rotor is stationary with its long dimension pointing generally in the direction of flight and the rotor is supported by its middle portion, a small angle of attack, or a large one, will result in blade forces generally in a vertical direction which will depend on the angle of attack. These forces cause blade deflection which change the effective angle of attack and therefore the loads. Now it will be understood by those skilled in the art that for such a blade the upstream portion of it will deflect in such a manner as to increase the loads on the blade and may even stimulate motions of vibration in a vertical plane; the trailing blade, however, will deflect under the load in a direction which decreases the loads on the blade, and any oscillation need not be aggravated. It is therefore advantageous from the structural viewpoint to have a supporting nacelle fairing principally in the upstream blade of the rotor. With these considerations in mind, we have designed the structure shown in FIGURES X and XI.

Specifically, in FIGURE X, we show a wing 111 supporting a rotor 112 having an upstream blade 113 and a downstream blade 114. Below the upstream blade there is shown a structural fairing 115 which is articulated about pivotal axis 116 with respect to wing 111. As shown in FIGURE X, the structure is in its high speed flight condition; in FIGURE XI, the same structure is shown in vertical flight condition with the structural fairing 115 moved downwards to allow complete clearance of blade 113. Also shown is a landing gear installation having a wheel 117 fixed to support 115 and having retractable door fairings 118. These fairings are extremely simple and allow the use of a non-retractable wheel on structural support 115 which then acts as a landing gear leg of the type described in FIGURE VII. There is also shown in FIGURE XI a sliding catch mechanism 119 utilized to provide structural support to upstream blade 113 during high speed flight.

It is well to summarize the advantage of the type of movable rotor-fairing nacelles of the type described in FIGURES VIII through XI. These types of structures provide a greater amount of clearance between the rotors and their nacelles making it possible to utilize a great deal of flapping motion in rotor blades without danger of collision between the nacelle and the rotor. Also, however, by removing the entire rotor nacelle away from the rotor, the aerodynamic interference and excitations between the rotors and the nacelles and supporting mechanisms are greatly decreased. Furthermore, the structures of these last figures can serve also as auxiliary or main gears for the convertiplane thereby giving great latitude of design for a high speed fuselage. In these figures, as in the previous ones of the specification, we achieve cooperation between the various demands of the vehicle and the singular type of structures described.

Let us now consider by way of example a numerical calculation of some of the parameters of our convertiplane shown on FIGURES I, II and III. The hovering efficiency parameter is the disc loading $$\frac{T}{A}$$

where T is thrust of rotor and A is total disc area. We consider the relation between the hovering efficiency parameter and the aircraft's gross weight in relation to FIGURE I. In hover, the following equation expresses vertical equilibrium:

$$\frac{T}{A} = \frac{W}{N(\pi r^2)}$$

where W=gross weight, N is number of rotors and r is radius of each rotor. We select a rotor disc loading of 15 pounds per square foot as a useful value for high speed aircraft of the class described. (This compares to about 4 pounds per square foot for helicopters and about 30 pounds per square foot for propeller VTOL craft.) We then solve for gross weight, using a scale factor of 1 inch=5 feet for FIGURE I.

$$W = \frac{T}{A}[N\pi r^2]$$

inserting the selected values we obtain a gross weight of $W = 15[2\pi(9.3)^2] = 8,100$ pounds, which is appropriate for the speed and size of the aircraft of FIGURE I. By way of comparison, if we assume the same gross weight but use helicopter disc loadings of about 4 lbs. per square foot, we can solve for the radius of the rotor $$r = \left[\frac{W}{N}\frac{1}{T/A}\frac{1}{\pi}\right]^{1/2} \quad r = \left[\frac{8,100}{2}\frac{1}{4}\frac{1}{\pi}\right]^{1/2} = 18$$

We see that use of conventional helicopter type of disc loading is structurally impractical as the size of the rotor is increased by a factor of about 2; these calculations illustrate the importance of analyzing the parameters of the craft in order to design structures which are practical.

Various further modifications and alterations from those described hereinabove can obviously be made without departing from the spirit of this invention, and the foregoing are to be considered purely as exemplary applications thereof. For example, the rotor of FIGURES I, II, III and V could have upward axial displacement on its central shaft in order to increase the clearance between the nacelle and rotor when the rotor is operative. This method of axial displacement is known to those skilled in the art and will not be shown here. Also, in FIGURE III, the dihedral of the wing could be reversed and the rotor mounted below the wing; in FIGURE IV, the pivoted doors could be substituted by sliding doors, and in FIGURE VI, the rear rotor 67 could be replaced by an upward force produced by deflecting the exhaust of the fuselage mounted gas turbine downwardly. Also, although the invention has been shown in convertiplanes being driven at high speeds by conventional jet engines, it would also be possible to utilize the invention with propeller-driven aircraft. For instance, in FIGURE I there could be a centrally located conventional propulsive propeller, or a conventional propeller mounted at either or both extremities of the wing tip fuel tank. Also the cylindrical elongated bodies utilized to house the helicopter-type rotor blades for high speed flight can be utilized for purposes other than fuel storage; for instance, to house a retracted landing gear, or to house armament. In particular, the cylindrical bodies can be extended rearwardly in a special configuration as a twin-boom arrangement to support the tail surfaces; the central fuselage then serves to carry a large and bulky payload with rearward loading. The tail surfaces are supported between the rear ends of the cylindrical surfaces. The last configuration may be used with a fuselage of large volume capacity, and preferably with propulsive propellers at the forward end of the cylindrical bodies. The actual scope of the invention is to be indicated by reference to the appended claims.

We claim:

1. An aircraft having a pair of wings one on each side of central fuselage; a pair of elongated nacelles one on each wing adjacent to the wing tips of said wings with each nacelle having a movable upper portion; and a pair of rotors mounted one on each nacelle with each rotor having a shaft restrained from lateral motion and approximately perpendicular to said wings, each one of said rotors having rotor blades capable of rotary motion about said shafts, said rotors and nacelles being further characterized in having a high speed disposition in which said rotor blades are stationary and adapted to be faired with said nacelles in a low drag disposition with said shafts in an approximately vertical direction passing through said nacelles, and a low speed disposition in which said movable upper portions of said nacelles are moved below said rotor blades and said blades have rotary motion about said shafts.

2. An aircraft having a central body portion with a long dimension generally parallel to the high speed direction of flight of said aircraft, and a pair of wings extending laterally from said central body portion and in substantial symmetry to said central body portion; and a generally cylindrical elongated body mounted adjacent to the wing tip of each of said wings with said cylindrical body having a long dimension generally parallel to the long dimension of said central body portion of said aircraft and a movable upper portion, and a pair of rotors mounted on said wings one contiguous to each of said cylindrical bodies with each of said rotors having a rotor shaft and a rotor blade; said rotors being capable of motion between a first disposition in which said shafts have an approximately vertical direction and are stationary and said blades have an elevated position above said wings, being faired with said cylindrical bodies below said movable upper portions, and a second disposition in which said movable cylinder upper portions are moved downwards with respect to said elongated bodies below said rotor blades, said rotors having rotary motion about said rotor shafts with said shafts retaining an approximately vertical direction and said rotor blades retaining said elevated position above said wings.

3. The structure of claim 2 further characterized in that the quotient formed by dividing the weight of the aircraft by the sum of the areas of the circles defined by the tip path of the rotors is at least as great as approximately twelve.

4. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that each of said cylindrical bodies is mounted adjacent to and inboard from the wing tip of said wings, and that the portion of said wings inboard from said body has positive dihedral and the wing portions outboard from said bodies has negative dihedral.

5. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that each of said cylindrical bodies has a lower fixed body portion and an upper surface body portion pivotally connected to said lower fixed body portion at a pivotal axis substantially parallel to a longitudinal axis concentric with said cylindrical body, and means provided to move said upper surface body portion between a first position in which it encloses said rotor between said upper surface body portion and said lower body portion of said cylindrical body when said rotor is in said first disposition, and a second position in which said upper surface body portion is located below said rotor when said rotor is in its second disposition.

6. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies and a second disposition in which said rotors have rotary motion about rotor axes and with respect to said cylindrical bodies and said aircraft; said aircraft further characterized in that each of said cylindrical bodies has a lower body portion which is a fuel container.

7. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft further characterized in that each of said cylindrical bodies and the wing portions outboard of each of said cylindrical bodies are mounted on said wings inboard of said cylindrical bodies at a spanwise pivotal connection on said inboard wing portions, and means provided to change the inclination of said cylindrical bodies between a position substantially parallel to the longitudinal dimension of said central body portion, and a position in which each of said cylindrical bodies is inclined to said longitudinal dimension of said central body portion.

8. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft further characterized in that said wings are mounted on the rearward end of said central body portion, and in that at the forward end of said central body portion there are placed a pair of auxiliary Canard wings extending on opposite sides of said central body portion in substantial symmetry to said central body portion.

9. The structure of claim 8 further characterized in that on each side of said aircraft, said cylindrical bodies extend between the wing tip of said Canard wing surface and approximately the middle portion of said wing.

10. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that said wings are swept back wings located adjacent to the rearward end of said central body portion and that an additional pair of wings is located at the forward end of said body portion having swept forward planform, with said cylindrical body on each side of said central body portion extending between the wing tip portions of said swept forward and swept back wings.

11. An aircraft having a central fuselage parallel to the high-speed direction of flight of said aircraft and a pair of wings mounted substantially symmetrically on said fuselage, with each of said wings having adjacent to its wing tip a wing-tip fuel tank generally parallel to said fuselage, and with said tip fuel tank mounting on its upper portion fairing doors and rotor having two blades each of a radius approximately equal to the span of each of said wings, and with said rotor capable of movement between a stationary disposition in which said blades are aligned with said fuel tank and inside said fairing doors and a rotating disposition in which said fairing doors are located below said rotor.

12. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that each of said cylindrical bodies is mounted on wing-tip panel portions which are articulated to said wings at generally chordwise pivotal axis located inboard of said cylindrical bodies, and means provided to move said wing-tip panel portions and cylindrical bodies with respect to said wings and rotors between a high speed position in which at least a portion of said wing-tip panel portions are substantially parallel to the plane of said wings when said rotors are in said first disposition, and a slow speed position in which said wing tip panel portions are inclined downwardly from said high speed position when said rotors are in said second disposition.

13. The structure of claim 12 further characterized in that landing gear means are mounted on each of said wing-tip portions of said wings.

14. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that each of said cylindrical bodies has an upstream portion, a central portion and a downstream portion with said upstream and downstream portions articulated to said central portion at connections having pivotal axis generally in a spanwise direction, and means provided to move said upstream and downstream portion of each of said cylindrical bodies between a high speed position in which they are substantially adjacent to said rotors when said rotors are in their first disposition, and a slow speed position in which said upstream and downstream portions are inclined downwardly from said high speed position.

15. The structure of claim 14 further characterized in that landing gear means are mounted at least on one of said upstream and downstream portions of each of said cylindrical bodies.

16. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that said rotor has an upstream blade when said rotor is in said first disposition, and in that said cylindrical body extends forward from said wing and is movable between a high speed position in which said body is below and adjacent to said upstream blade with connecting means engaging said upstream blade and said body, and a slow speed position in which said body is inclined downwardly from said high speed position when said rotor is in said second disposition.

17. The structure of claim 16 further characterized in that landing gear means are mounted in said cylindrical bodies.

18. An aircraft having a central body portion with a long dimension generally parallel to the high speed direction of flight of said aircraft, and a pair of wings extending laterally from said central body portion and in substantial symmetry to said central body portion; a generally cylindrical elongated body mounted adjacent to the wing tip of each of said wings with said cylindrical body having a long dimension generally parallel to the long dimension of said central body portion of said aircraft, and a pair of rotors mounted on said wings one adjacent to each of said cylindrical bodies and capable of motion between a first disposition in which said rotors are stationary and are adapted to be faired to said cylindrical bodies with said rotors having blades extending in the direction of the long dimension of said cylindrical bodies and having a rotor axis generally perpendicular to the long dimension of said cylindrical bodies, and a second disposition in which said rotors have rotary motion about rotor axes and with respect to said cylindrical body and said aircraft; said aircraft being further characterized in that it has horizontal tail surfaces supported by the rearward ends of each of said cylindrical bodies.

References Cited in the file of this patent

FOREIGN PATENTS

| 526,104 | Great Britain | Sept. 11, 1940 |
| 794,507 | France | Dec. 12, 1935 |